US009178228B2

(12) United States Patent
Heddrich et al.

(10) Patent No.: US 9,178,228 B2
(45) Date of Patent: Nov. 3, 2015

(54) SOLID OXIDE FUEL CELL SYSTEM

(75) Inventors: Marc Heddrich, Dresden (DE); Felix Marschallek, Dresden (DE); Wieland Beckert, Radebeul (DE); Thomas Pfeifer, Dresden (DE); Michael Stelter, Chemnitz (DE); Matthias Jahn, Dresden (DE); Andreas Pönicke, Dresden (DE); Carsten Lorenz, Dresden (DE); Rico Belitz, Dresden (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 601 days.

(21) Appl. No.: 13/389,183

(22) PCT Filed: Jul. 7, 2010

(86) PCT No.: PCT/EP2010/004093
§ 371 (c)(1),
(2), (4) Date: May 21, 2012

(87) PCT Pub. No.: WO2011/015261
PCT Pub. Date: Feb. 10, 2011

(65) Prior Publication Data
US 2012/0225363 A1    Sep. 6, 2012

(30) Foreign Application Priority Data
Aug. 6, 2009   (DE) .................. 10 2009 037 148

(51) Int. Cl.
*H01M 8/06*    (2006.01)
*H01M 8/04*    (2006.01)
*H01M 8/12*    (2006.01)

(52) U.S. Cl.
CPC ...... *H01M 8/04022* (2013.01); *H01M 8/04074* (2013.01); *H01M 8/0625* (2013.01); *H01M 8/0662* (2013.01); *H01M 2008/1293* (2013.01); *Y02E 60/50* (2013.01); *Y02E 60/525* (2013.01)

(58) Field of Classification Search
CPC .............. H01M 8/04022; H01M 8/04074; H01M 8/0625; H01M 8/0662; H01M 2008/1293; Y02E 60/525; Y02E 60/50

USPC .................................... 429/408, 423
See application file for complete search history.

(56) References Cited

U.S. PATENT DOCUMENTS

| 5,554,454 A | 9/1996 | Gardner et al. |
| 6,183,703 B1 | 2/2001 | Hsu et al. |

(Continued)

FOREIGN PATENT DOCUMENTS

| DE | 196 39 517 A1 | 4/1998 |
| DE | 103 10 642 | 9/2004 |

(Continued)

OTHER PUBLICATIONS

"International Application No. PCT/EP2010/004093, International Preliminary Report on Patentability issued Feb. 7, 2012", 6 pgs.

(Continued)

*Primary Examiner* — Gary Harris
(74) *Attorney, Agent, or Firm* — Schwegman Lundberg & Woessner, P.A.

(57) ABSTRACT

The invention relates to a solid oxide fuel cell system, wherein planar fuel cells are arranged in stacked form and in this respect an integrated post-combustion of non-oxidized components, or of not fully oxidized components, in the exhaust gas can take place. The fuel cells of a system in accordance with the invention have a cathode-electrolyte-anode unit. A bipolar plate is arranged between two respective fuel cells and channels for the supply and removal of a fuel gas to anodes and of an oxidizing agent to cathodes are present. The exhaust gases at the anode side or at the cathode side are introduced via internal additional channels or directly into an afterburner in which a catalytic post-oxidizing of the exhaust gas mixture formed with the exhaust gas at the anode side and at the cathode side takes place. In this respect, a catalytic afterburner is associated with every single fuel cell or with a group formed of a plurality of fuel cells and the afterburners are arranged so that exhaust gas discharged from a fuel cell at the anode side or at the cathode side can enter directly into an afterburner.

11 Claims, 6 Drawing Sheets

(56) References Cited

U.S. PATENT DOCUMENTS

| | | | |
|---|---|---|---|
| 6,569,554 B1 * | 5/2003 | Doggwiler et al. | 429/440 |
| 2003/0124399 A1 | 7/2003 | Amrhein et al. | |
| 2004/0081871 A1 | 4/2004 | Kearl et al. | |
| 2005/0249991 A1 | 11/2005 | Pastula et al. | |
| 2006/0263665 A1 | 11/2006 | Schaevitz et al. | |
| 2007/0054036 A1 * | 3/2007 | England et al. | 427/115 |
| 2007/0104992 A1 | 5/2007 | Tsai et al. | |
| 2008/0057196 A1 | 3/2008 | Ishikawa et al. | |
| 2008/0107947 A1 * | 5/2008 | Jackson et al. | 429/33 |
| 2010/0068582 A1 * | 3/2010 | Finnerty | 429/26 |

FOREIGN PATENT DOCUMENTS

| | | |
|---|---|---|
| DE | 10 2009 013 599 A1 | 3/2010 |
| EP | 0 668 622 A1 | 8/1995 |
| EP | 1 037 296 | 9/2000 |
| EP | 1 075 033 A1 | 2/2001 |
| EP | 1 473 794 A1 | 11/2004 |
| JP | 2004-014449 A | 1/2004 |
| JP | 3845124 B2 | 11/2006 |
| JP | 2007-134298 A | 5/2007 |
| JP | 2008-284503 A | 11/2008 |
| JP | 2009-087550 A | 4/2009 |
| WO | WO-03/096469 A1 | 11/2003 |

OTHER PUBLICATIONS

"International Application No. PCT/EP2010/004093, International Search Report and Written Opinion mailed Aug. 30, 2010", 13 pgs.

"Japanese Application Serial No. 2012-523211, Office Action mailed Feb. 4, 2014", (w/ English Translation), 6 pgs.

"Machine Translation of JP 2004-014449A, published Jan. 15, 2004", 16 pgs.

"Machine Translation of JP 2009-087550A, published Apr. 23, 2009", 12 pgs.

* cited by examiner

SOLID OXIDE FUEL CELL SYSTEM

PRIORITY CLAIM TO RELATED APPLICATIONS

This application is a national stage application under 35 U.S.C. § 371 of PCT/EP2010/004093, filed Jul. 7, 2010, and published as WO 2011/015261 A1 on Feb. 10, 2011, which claims priority to German Application No. 10 2009 037 148.6, filed Aug. 6, 2009, which applications and publication are incorporated by reference as if reproduced herein and made a part hereof in their entirety, and the benefit of priority of each of which is claimed herein.

The invention relates to a solid oxide fuel cell system, wherein planar fuel cells are arranged in stacked form and in this respect an integrated post-combustion of non-oxidized components, or of not fully oxidized components, in the exhaust gas can take place.

The solid oxide fuel cell systems in question are formed with cathode-electrolyte-anode units (CEAs). These units of the individual fuel cells are separated from one another by bipolar plates, with the bipolar plates forming electrical conductors from one fuel cell to a fuel cell arranged next to it. A fuel gas is in this respect supplied at the anode side and an oxidizing agent, which is air as a rule, is supplied to the individual fuel cells at the cathode side. For this purpose, structures which can be flowed through by these gases are present in the anode spaces and cathode spaces. Typically, the fuel gas and the oxidizing agent are conducted past anodes and cathodes either in cross-flow or in counter-flow.

Since a complete conversion of the fuel gas used is not achievable as a rule, it is necessary to carry out a post-oxidation in afterburners in order to post-treat components of the fuel cell exhaust gas which have not oxidized or have not completely oxidized.

If no pure hydrogen is used as the fuel gas, a reforming of a fuel present as a hydrocarbon compound, for example methane or natural gas, is carried out. For this purpose, reformers are used in which a water vapor reforming can frequently be carried out.

A fuel cell battery having post-combustion at the periphery of a fuel cell stack is known from EP 1 037 296 B1. In this respect, the exhaust gas of the fuel cells is conducted to their outer rims and can exit them via openings which open into a post-combustion space. In this respect, at least one post-combustion space is formed such that the exhaust gas of all stacked fuel cells is conducted into it. The exhaust gases of anodes and cathodes enter into the one post-combustion space or into the plurality of post-combustion spaces. In this respect, the air discharged from the cathodes can be used as an oxidizing agent for components of the fuel gas contained in the exhaust gas at the anode side which have not oxidized or which have not completely oxidized. However, this document does not contain any statements on the kind of post-combustion.

The post-combustion spaces known from it are connected to all stacked fuel cells. In this respect, however, a back-diffusion of water vapor in fuel cells can occur, which can in turn result in damage leading up to destruction of anodes.

In addition, undefined flow and pressure conditions can occur in these post-combustion spaces which can have an affect on insufficient oxidizing and can influence the further outlet of exhaust gas from the fuel cells.

Additional components furthermore have to be attached around the fuel cell stack, which causes an increased effort for the installation, with space problems also being able to occur thereby and with the volume-specific power density being reduced. The stable sealing of these components at high temperatures is also very problematic.

A high-temperature fuel cell system is described in DE 103 10 642 A1 in which afterburners and reformers are present as additional elements beside stacked fuel cells. They are blocked on to the fuel cell stack as separate elements and all fuel cells are supplied with reformed fuel gas from a reformer and the exhaust gas of all fuel cells is supplied to a common afterburner. The reformer and afterburner therefore have to be dimensioned for the respective fuel cell stack, while taking its power into account, and must therefore be adapted to said stack since otherwise the post-combustion cannot be carried out in the desired and required form.

It is therefore the object of the invention to provide a solid electrolyte fuel cell system which can be manufactured in an inexpensive and flexible manner.

In accordance with the invention, this object is achieved by a system having the features of claim 1. Advantageous embodiments and further developments of the invention can be achieved with features designated in subordinate claims.

Starting from known fuel cell systems, a plurality of planar fuel cells are arranged in stacked form in a system in accordance with the invention.

A respective cathode-electrolyte-anode unit is present at each fuel cell. The fuel cells are separated from one another, but electrically conductively connected to one another, by means of bipolar plates (also called interconnectors).

In addition, channels are present for the supply and removal of fuel gas to anodes and of an oxidizing agent to cathodes, with the exhaust gases at the anode side or at the cathode side being introduced via internal, additional channels or directly into an afterburner in which a catalytic post-oxidation of the exhaust gas mixture formed in the exhaust gas at the anode side and at the cathode side can be carried out.

In accordance with the invention, a catalytic afterburner is associated with every single fuel cell or with a group formed of a plurality of fuel cells. The afterburners of a system are arranged in this respect so that exhaust gas discharged from a fuel cell at the anode side or at the cathode side enters directly into an afterburner. It is ensured in this respect that at least either the exhaust gas of the anodes or the exhaust gas of the cathodes enters directly into an afterburner from the respective fuel cell and the respective other exhaust gas then moves via channels within and integrated into the system into the respective afterburner. This detour of the one exhaust gas flow is always necessary when the fuel gas and the oxidizing agent are conducted through the fuel cells in counter-flow or in cross-flow. The outlet of one of the two exhaust gas flows is thereby arranged offset to the afterburner by 90° or 180°.

In the event that each fuel cell does not have its own afterburner, a maximum of ten fuel cells should be combined to a group and should be associated with this afterburner.

An open-pore structure, which can be flowed through by the exhaust gas mixture and which has a catalytic effect or at which at least one catalytically active component is present, should be formed or arranged in the afterburners. There is, however, also the possibility of providing the inner surface of the afterburners with a catalytically active coating. The exhaust gas mixture can in this respect be conducted through channels which are formed in the afterburner whose walls are coated in this manner and can in this respect be post-oxidized.

In the cathode-electrolyte-anode units, the anodes and the cathodes can be formed at two oppositely arranged sides of the solid electrolyte in an electrochemically active region of the fuel cells. The solid electrolyte can have a larger surface than the electrochemically active region in which the anode and cathode are formed, for example as a coating on the electrolyte. The solid electrolyte can thereby form a separating layer for adjacent gas spaces. Channels for the supply and removal of fuel gas, oxidizing agent and exhaust gas can be formed by openings formed in the solid electrolyte. The fuel gas can flow via these channels to anodes; air can flow as a possible oxidizing agent to cathodes and from there either, as already mentioned, directly into an afterburner or via a channel into the afterburner.

A system in accordance with the invention can particularly advantageously also have a separate reformer for every single fuel cell or a group of fuel cells, said reformer being associated therewith. In this respect, the fuel gas can be introduced from the reformers at the anode side directly into the respective associated fuel cell(s).

In a system in accordance with the invention, an internal reforming in the individual fuel cells can also be utilized by means of water formed in the electrochemical reaction so that reformers with reduced capacity can be used at the systems or reformers can be dispensed with.

There is in addition the possibility of arranging the afterburners and the reformers of the system parallel to one another and in a common plane in stacked form beside the electrochemically active regions and to make them an integral component of the system. A common reformer can, however, also be present for all fuel cells of the system which can supply them with reformed fuel gas.

Reformers which are used in a system in accordance with the invention can be supplied with a fuel/air mixture. In this respect, the fuel can be reformed in a known manner by the supply of water vapor at high temperatures so that, for example, on the use of methane or of natural gas as the fuel, the fuel gas can be supplied to the fuel cells at the anode side with hydrogen and contained carbon monoxide. The reforming can, however, also take place by a partial oxidation, with a smaller portion of hydrogen then being able to be contained in the reformed fuel gas than is the case with a steam reforming. However, a lower technical plant effort for the reforming is required in this case. Catalytically active coatings or structures can also be used in the reformers.

To support the processes to be carried out in the reformers, heat exchangers can be provided there. They utilize the waste heat of the fuel cells and increase the temperatures at the reformers, which have a favorable effect for the chemical reactions taking place there, by heat conduction to the heat exchangers. The heat exchangers at the afterburner utilize the waste heat of the afterburner for the preheating of the oxidizing agent supplied to the cathodes.

As already addressed, enlarged electrolytes can be provided at the fuel cells so that afterburners and/or reformers arranged next to one another are separated from one another in a fluid-tight manner by the associated heat exchangers with the electrolytes of the cathode-electrolyte-anode units. Since these are not electrically conductive, this is possible without problems.

A system in accordance with the invention can be produced inexpensively since it can be assembled in a modular manner with different powers from individual components which are each made the same and which form a plane of the system. In this respect, the respective afterburners and optionally also the reformers are always ideally dimensioned and have the corresponding capacities. Systems with electrical powers in the range 70 W to 50 kW can thus be realized. With corresponding electrical connector contacts and a possible controlled supply of fuel or of fuel gas and oxidizing agent, individual selected fuel cells can also be operated, whereas other fuel cells remain switched off so that a partial load operation can be realized in a simple form and in this respect at least the post-combustion of the exhaust gases can take place with afterburners ideally dimensioned for this purpose.

In addition, a compact structure and a dispensing with additional lines, seals and vales is possible since all substances and gases required for the operation can be arranged within a housing during operation which housing surrounds the whole system and in particular the channels for the gas conduction can be formed directly at components of the system.

There is the possibility of additionally utilizing the high temperatures present in the operation of the fuel cells for reforming and for post-combustion within the system so that no additional effort is also required for heat exchangers and heat insulation. A temperature compensation can be utilized by heat conduction within the system and in the individual planes.

Fuel cells having the associated afterburners and optionally having the reformers can be arranged in a common plane and thereby represent an unhindered fluidic serial connection in the respective plane.

A thermal integration, a high electrical system efficiency and a high volume-related and mass-related power density can be achieved.

Since the individual planes within the system can each be made the same, stacks can be formed with them in any desired number. A plane can thus represent a repeat unit. They can be connected to one another in different manners. Force transmitting and shape matched connections as well as connections with material continuity can thus be used.

Using solders is particularly favorable for these connections and using glass solders known per se is particularly preferred. Such solders cannot only be utilized for the connection, but also for a sealing. Glass solder can thus be applied, for example, to specific regions of the surface of the electrolyte of the CEA and can form seals there. This e.g. applies to regions around openings which are present in the electrolyte in order to form channels for a gas conduction, for example.

The invention will be explained in more detail by way of example in the following.

There are shown.

Figure 1:
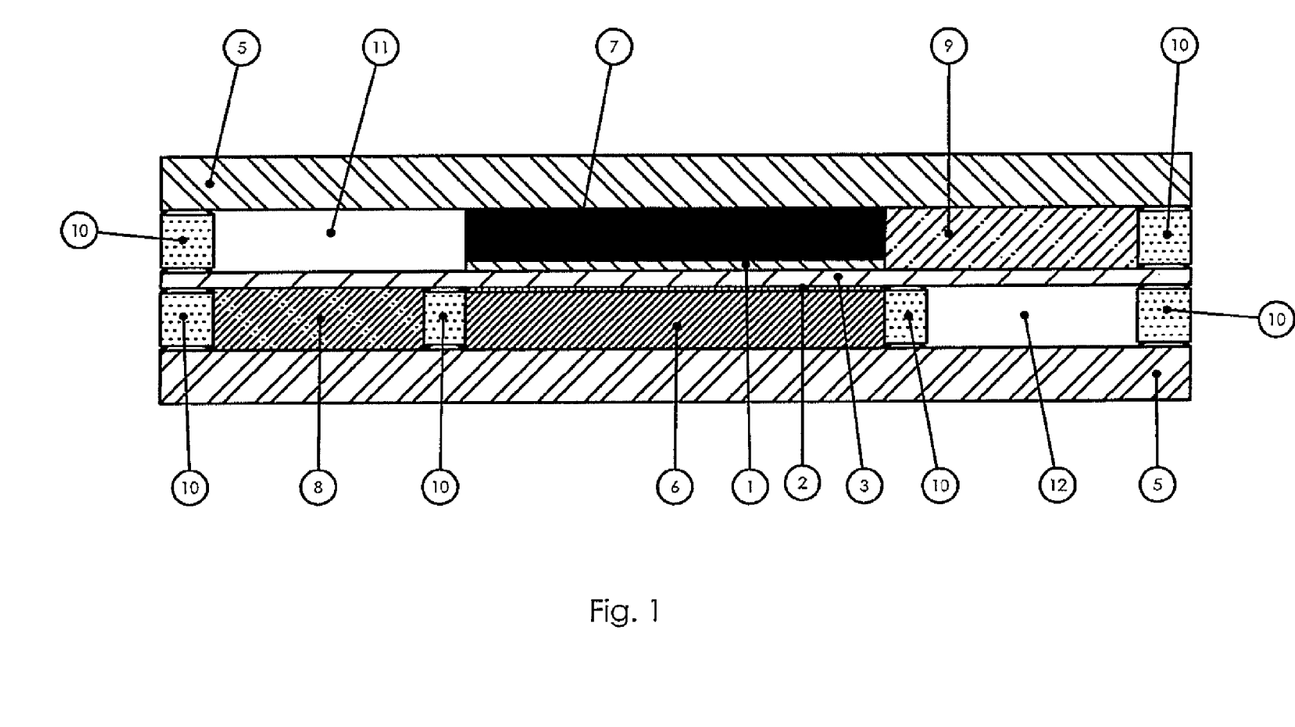
FIG. 1 a sectional representation through a plane such as can be used in a system in accordance with the invention.

FIG. 1 in intended to show a particularly advantageous embodiment of a plane which can be used for a solid electrolyte fuel cell system in accordance with the invention and can in this respect be called an "integrated process layer" (IPL).

The cathode-electrolyte-anode unit (CEA) is in this respect encompassed at the upper side and at the oppositely disposed lower side by bipolar plates 5. Seals 10 of glass solder are formed at the radially outer rims. The glass solder 14 can in this respect be utilized with a cathode frame 13 and the anode frame 17 for the sealing. Spaces are present between the bipolar plates 5 and the cathode 1 as well as the anode 2 through which fuel gas and oxidizing agent can flow over the electrochemically active regions. In this respect, channels through which oxidizing agent can flow and webs 7 as contacts for an electrically conductive connection between the cathode 1 and the bipolar plate 5 associated with it are present at the side of the cathode 1. A web 7 can be recognized here and gas conduction channels are present in front and behind thereof with respect to the plane of the drawing.

In the plane shown in FIG. 1, a reformer 8 and an afterburner 9 are present. In this respect, the reformer 8 is arranged within a further hollow space which is formed between the lower bipolar plate 5, the solid electrolyte 3 and seals 10 and is surrounded by these elements in a gas-tight manner. A fuel in the form of a suitable hydrocarbon compound can be introduced into the reformer 8 via a feed not shown here. Reformed fuel gas can be conducted with the help of a catalytically active coating and at increased temperature from the reformer through channels, which are in particular formed with the solid electrolyte 3, into the space at the side of the anode 2 and can in this respect be conducted in a manner flowing past its surface.

The electrochemical reaction which results in an electrical flow of current between the cathode 1 and the anode 2 and in a partial chemical conversion of the fuel gas takes place with air as supplied oxidizing agent, said air here flowing through the channels at the cathode 1 past at least one feed which is likewise not shown. An exhaust gas at the anode side therefore contains components which are not oxidized or are not oxidized completely and is therefore conducted via integrated channels into the afterburner 9 of this plane together with the exhaust gas at the cathode side which has a sufficiently high oxygen content for a post-oxidation.

The afterburner 9 is arranged and is formed in a space between the bipolar plate 5 arranged upwardly here, the solid electrolyte 3 and the seals 10. An open-pore ceramic structure 16 can be present therein which is provided with a catalytically active coating through which the exhaust gas mixture of the anode 2 and the cathode 1 flows and in this respect a heterogeneous catalytically supported post-combustion of the exhaust gas at the anode side can be achieved.

The space at the side of the anode 2 through which fuel gas can flow is filled with an open-pore metal foam 6 of nickel. This nickel foam also forms the electrically conductive connection between the anode 2 and the bipolar plate 5 associated therewith and arranged at the bottom here.

In the example shown, additional heat exchangers 11 are moreover present at the reformer 8 via which a temperature increase at the reformer 8 can be achieved by heat conduction from the inner region in which the electrochemical reaction takes place. The heat exchanger 12 at the afterburner 9 provides an increase of the temperature of the air supplied to the cathodes 1 via heat conduction.

Figure 2:
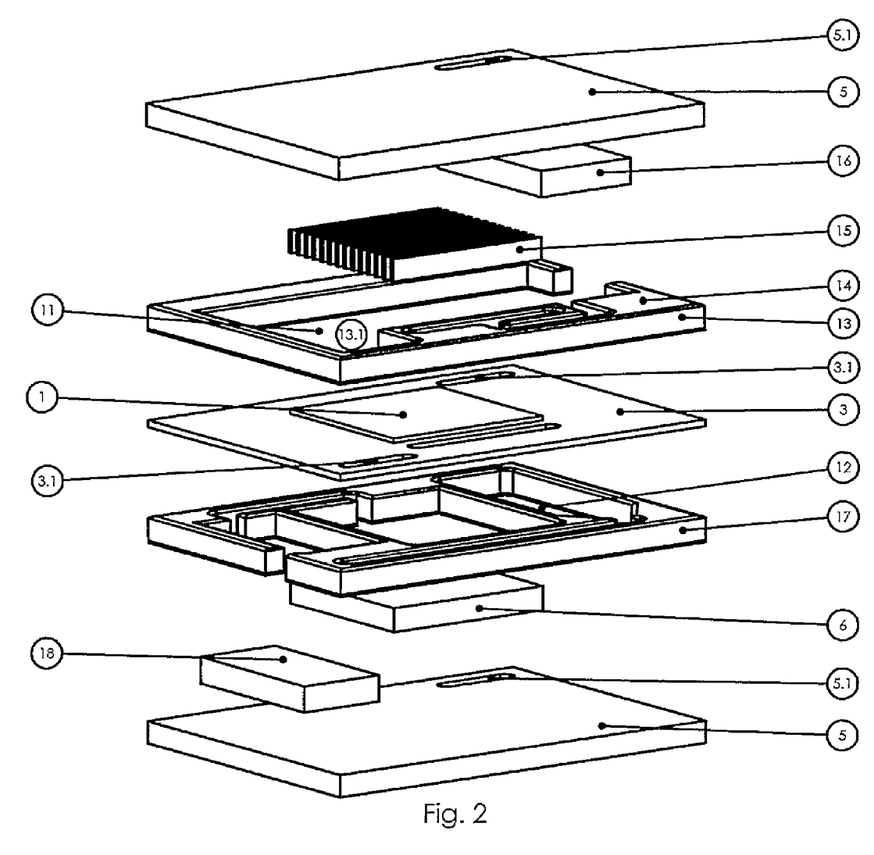
FIG. 2 an exploded representation of elements of a plane for a system in accordance with the invention.

The exploded representation in accordance with FIG. 2 shows a possible highly integrated structure. Openings 5.1 are here present in the bipolar plates 5 which are otherwise closed over their full surfaces and one of the gases for the operation of the system can flow via said openings from one plane in the next-adjacent plane.

A cathode frame 13 which can be obtained as a cut-out of a planar plate of a metallic material can be arranged between the CEA 1 to 3 and the upper bipolar plate 5. Suitable glass solder 14 with which the connection with material continuity and sealing can be achieved can be applied to the upper side and lower side of this cathode frame 13 before the assembly and the joining of the plane. In this connection, a free region is present in the cathode frame 13 in which the cathode 1 formed on the solid electrolyte 3 is arranged. In addition, a free space 13.1 is present, shown at the left at the cathode frame 13 here, into which the heat exchanger 11 for the reformer 8 can be inserted. Following this heat exchanger 11, an element 15 having channels and webs 7 for the supply of oxidizing agent via the cathode 1 and a bipolar plate 5 and a cathode 1 for the electrically conductive connection and following them a catalytically active, open-pore structure 16 for the afterburner 9 can be inserted in the free space.

The cathode 1 is arranged centrally at the upper side of the solid electrolyte 3. The anode 2 is present in a complementary manner on the lower side. Further openings 3.1 are present in the solid electrolyte 3 via which the fuel gas or the air as the oxidizing agent can flow from the upper side to the lower side of the solid electrolyte 3. In this respect, the flow directions of these gases in operation can be taken into account in order either to conduct exhaust gas at the anode side through these openings 3.1 or to conduct exhaust gas at the cathode side to the afterburner 9.

The solid electrolyte 3 is dimensioned here such that its radially outer rims likewise form a plate-like structure with cut-outs with the outer rims of the bipolar plates 5, the cathode frame 13 and the anode frame 17, which is arranged beneath the solid electrolyte 3, and is formed from a ceramic material.

The anode frame 17 has a free space into which an open-pore structure 18, which is catalytically active, can be inserted and there forms a reformer 8. A nickel foam 6 can be received in the central, following free space as an electrical contact for the anode 2 and the lower bipolar plate 5. The heat exchanger 12 for the afterburner 9 can be inserted into the free space of the anode frame 17 in turn arranged behind it.

Figure 3:
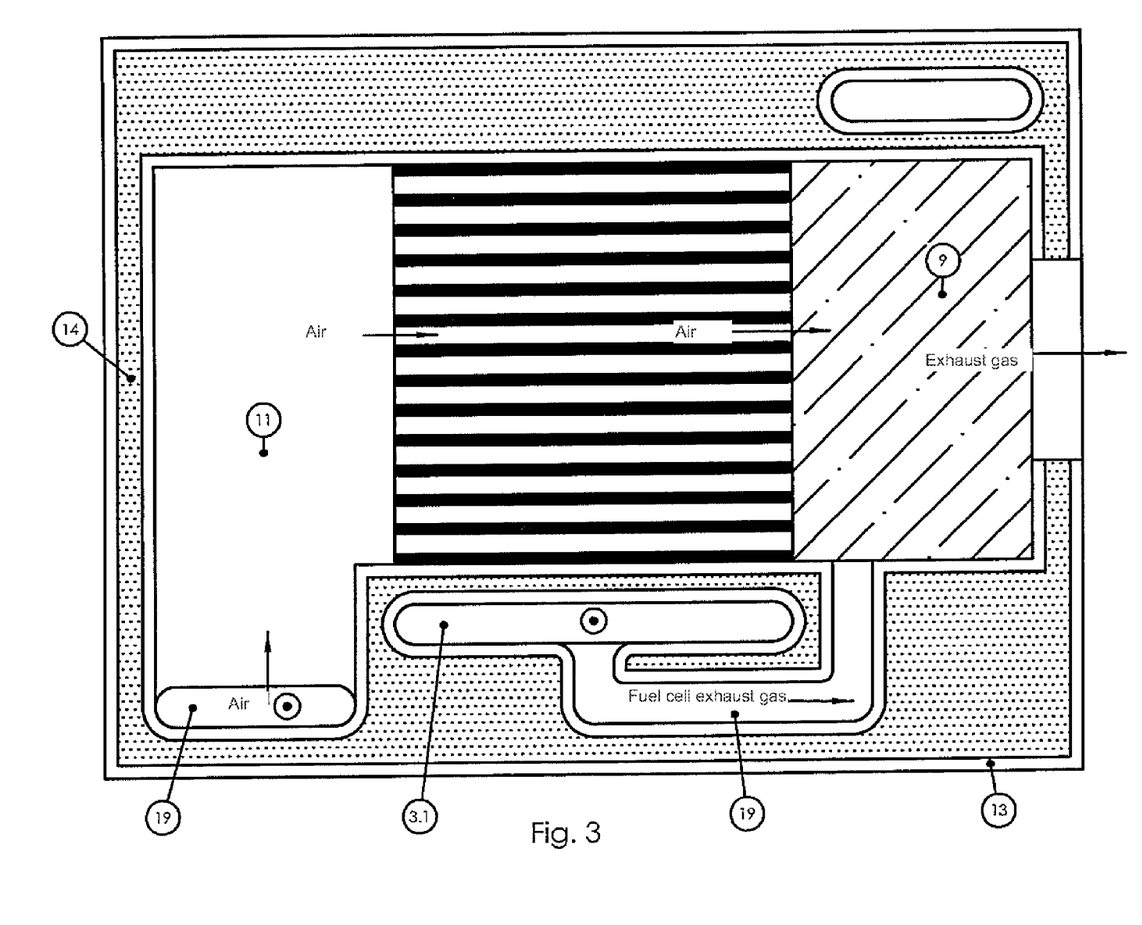
FIG. 3 a view from the cathode side of a plane in which fuel gas and oxidizing agent are conducted in cross-flow.

FIG. 3 is a view at the cathode side of a plane in which the fuel cells can be operated with fuel gas and oxidation agent in cross-flow. In this respect, a heat exchanger 11 is arranged at the reformer in the cathode frame 13, with air flowing over said heat exchanger at this side and with said air subsequently flowing over the cathode 1 and being utilized for the electrochemical reaction of the fuel cell. The air is supplied to the afterburner 9 after flowing over the cathode 1.

An opening 3.1 is formed in the solid electrolyte 3 and in the cathode frame 13 and a channel 19 is formed in the cathode frame 13, with the exhaust gas of the anode 2 being supplied via them to the afterburner 9 and in this respect being completely oxidized with catalytic assistance. Glass solder 14 for the forming of seals 10 and for the connection with material continuity is applied at both sides for the sealing and for the connection with material continuity to the bipolar plate 5 not shown here and to the solid electrolyte 3 of the CEA.

Preheated air moves from the anode side to the cathode side via the channel 19 with the heat exchanger 12 which is arranged at the afterburner 9.

Figure 4:
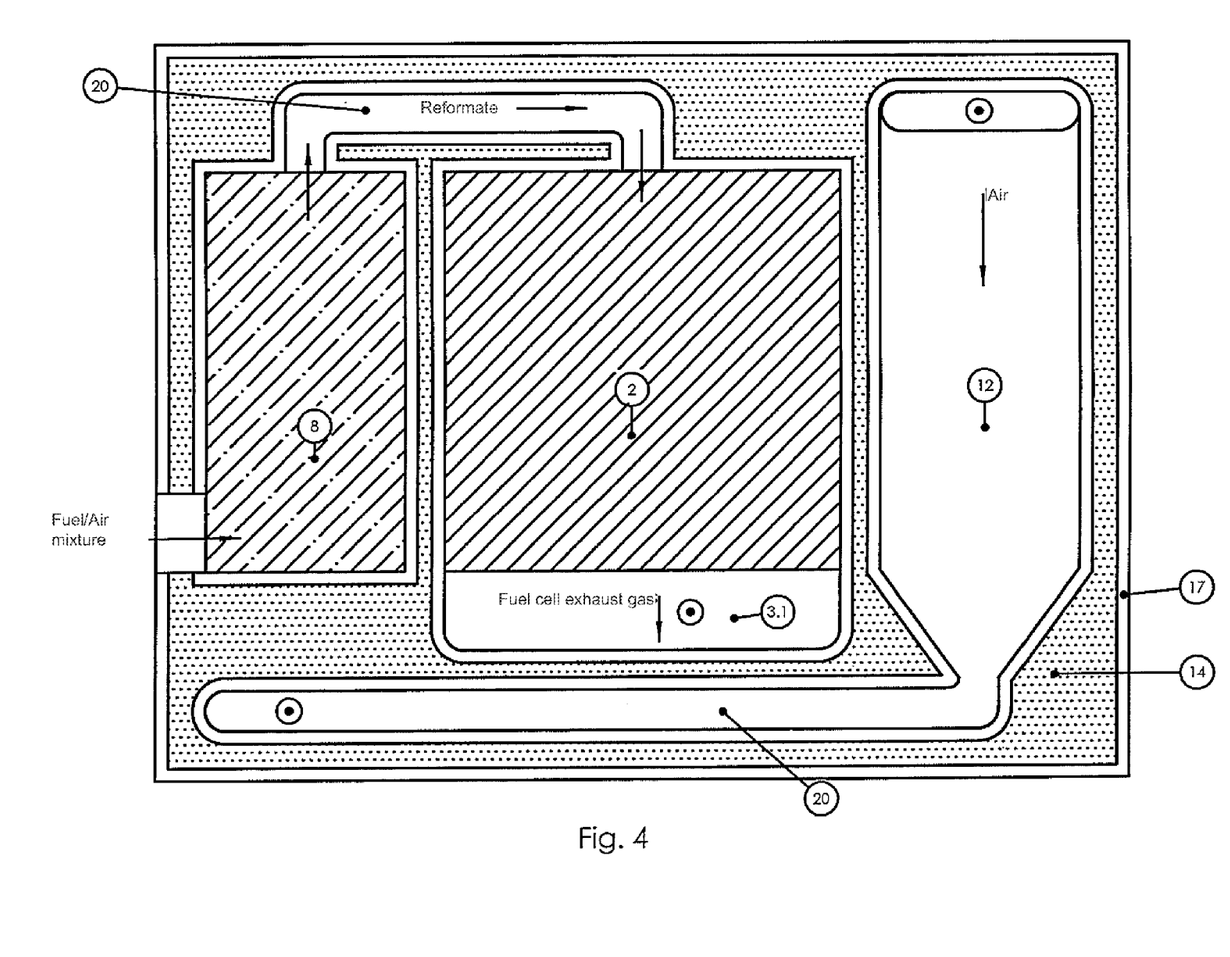
FIG. 4 a view from the anode side of a plane in which fuel gas and oxidizing agent are conducted in cross-flow.

FIG. 4 shows the other side of this plane. A fuel/air mixture is introduced from the outside into the reformer 8 and is converted there into a reformed fuel gas in which hydrogen and carbon monoxide are contained. The fuel gas is conducted over the channel 20 due to the cross-flow so that it flows perpendicular to the air at the cathode side over the anode 2 and the exhaust gas at the anode side is then supplied via the opening 3.1 to the cathode side and to the afterburner 9.

For the preheating of the air as the oxidizing agent, it can here be guided over the heat exchanger 12 and following this to the cathode 1 on other side through the channel 20.

The seals and the connection with material continuity by glass solder 14 are also again formed at this side between the anode frame 17, the solid electrolyte 3 and the bipolar plate 3 arranged at the bottom here.

Figure 5:
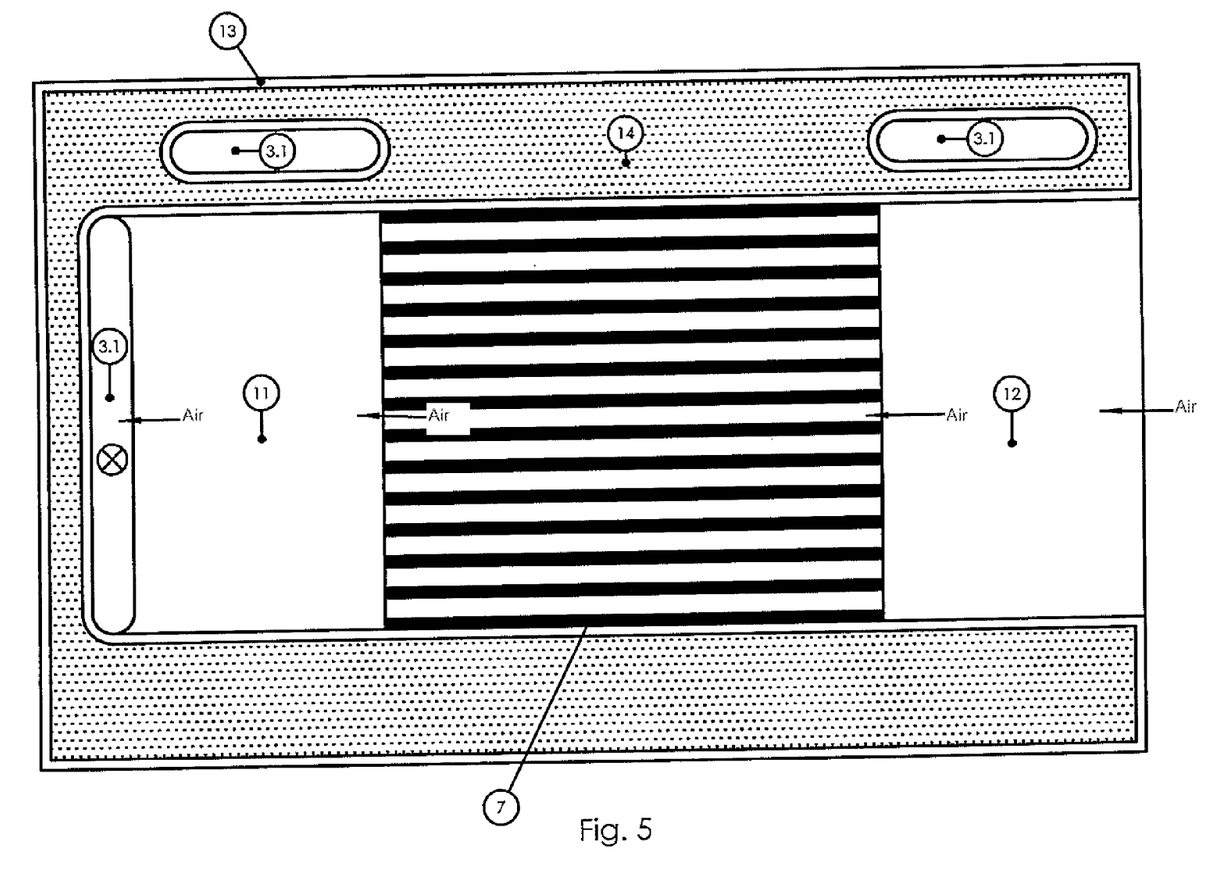
FIG. 5 a view from the cathode side of a plane in which fuel gas and oxidizing agent are conducted in counter-flow.
Figure 6:
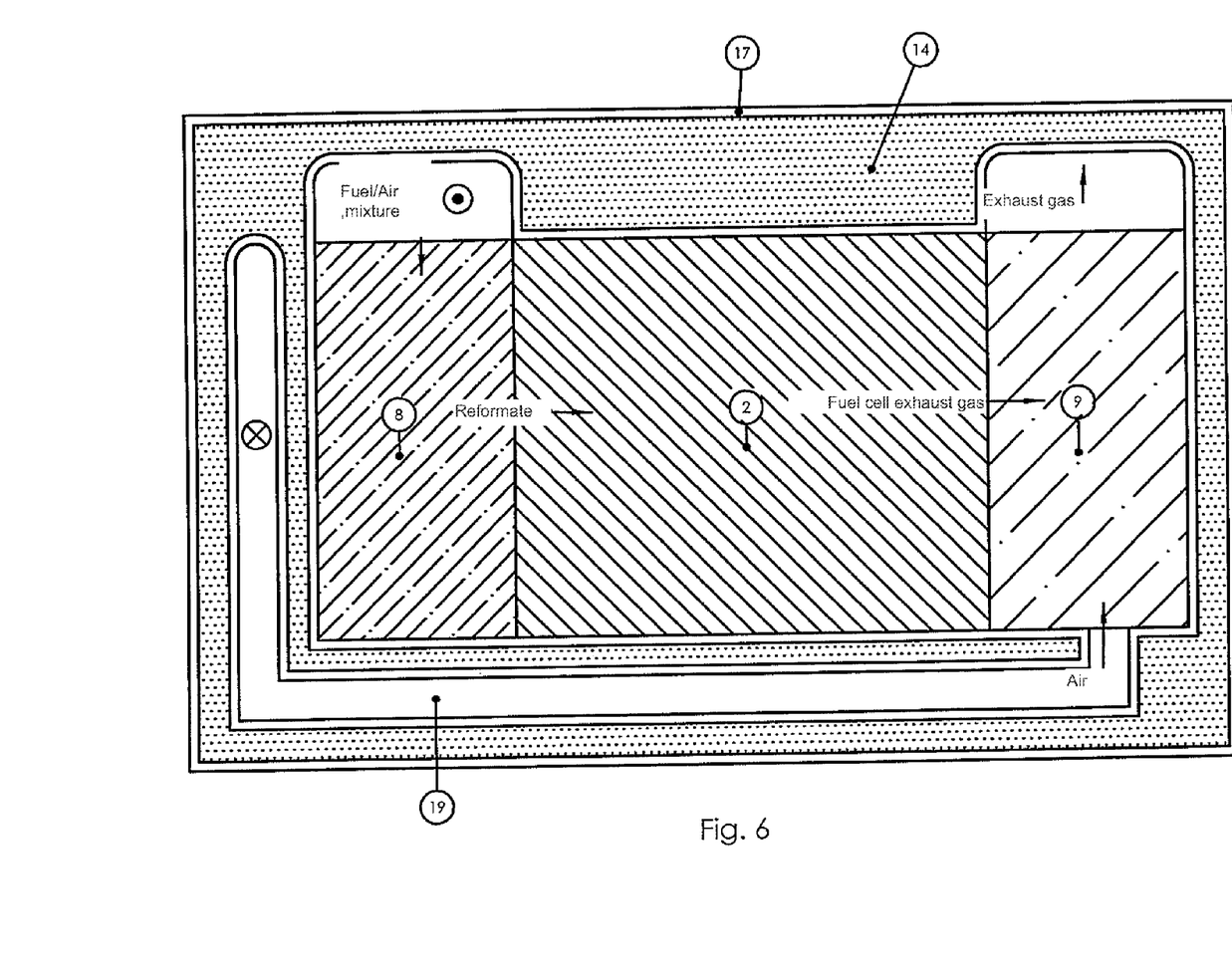
FIG. 6 a view from the anode side of a plane in which fuel gas and oxidizing agent are conducted in counter-flow.

FIGS. 5 and 6 show in schematized form the gas conduction at a plane in which air and fuel gas are conducted in counter-flow.

The air flows at the cathode side over the heat exchanger 12 and then over the channels formed between webs 7 over the cathode 1. Subsequent to the cathode, the air moves over the heat exchanger 11 at the reformer 8 and is conducted from there to the afterburner 9 to the anode side.

Openings 3.1 are formed in the solid electrolyte 3 for the gas conduction within the system. It again becomes clear in FIGS. 5 and 6 that the solid electrolyte 3 adopts a larger surface and thus a separation of the cathode side and of the anode side has been reached.

With the counter-flow conduction of the two gas flows required for the operation of the fuel cells, the reformer 8 and the afterburner 9 are arranged at the anode side.

The reformed fuel gas obtained with the reformer 8 is conducted via the anode 2 through the metal foam 6 and the anode exhaust gas and then to the afterburner 9. The air required for the post-oxidizing in the afterburner 9 can be supplied from the cathode side.

| Reference numeral list | |
|---|---|
| 1 | cathode |
| 2 | anode |
| 3 | solid electrolyte |
| 3.1 | opening |
| 5 | bipolar plate |
| 5.1 | opening |
| 6 | metal foam |
| 7 | webs |
| 8 | reformer |
| 9 | afterburner |
| 10 | seal |
| 11 | heat exchanger |
| 12 | heat exchanger |
| 13 | cathode frame |
| 13.1 | free space |
| 14 | glass solder |
| 15 | element with channels and webs |
| 16 | open-pore structure |
| 17 | anode frame |
| 18 | open-pore structure |
| 19 | channel |
| 20 | channel |

The invention claimed is:

1. A solid oxide fuel cell system, comprising: a plurality of planar fuel cells form a stack, comprising a bipolar plate arranged between two respective fuel cells, the fuel cells respectively including a cathode-electrolyte-anode unit, wherein, the respective anodes and the cathodes are formed at two oppositely arranged sides of a solid electrolyte in an electrochemically active region of the fuel cell, and wherein openings formed in the solid electrolyte present channels for at least one of the supply and removal of at least one of a fuel gas to anodes, an oxidizing agent to cathodes, and an exhaust gas, wherein the exhaust gas at the anode side or cathode side is supplied via channels or directly into an afterburner configured to permit a catalytic post-oxidizing of an exhaust gas mixture formed with the exhaust gas at the anode side and at the cathode side, wherein webs provide an electrically conductive connection between the cathodes and bipolar plates, wherein a catalytic afterburner is associated with every single fuel cell or with a group formed from a plurality of fuel cells, and the afterburners are arranged such that exhaust gas discharged from a fuel cell at the anode side or at the cathode side enters directly into an afterburner.

2. The system in accordance with claim 1, wherein a maximum of ten fuel cells are combined to a group and are associated with an afterburner.

3. The system in accordance with claim 1, wherein an open-pore structure is formed or arranged in the afterburners which is capable of being flowed through by the exhaust gas mixture and which is catalytically active or at which at least one catalytically active component is present.

4. The system in accordance with claim 1, wherein an inner surface of the afterburners is provided with a catalytically active coating.

5. The system in accordance with claim 1, wherein, the solid electrolyte has a larger surface than the electrochemically active region so that it forms a separating layer for adjacent gas spaces.

6. The system in accordance with claim 1, wherein a separate reformer is associated with every single fuel cell or with a group of fuel cells and fuel gas from the reformers enters directly into the fuel cells at the anode side.

7. The system in accordance with claim 1, wherein the afterburners and/or the reformers of the system are arranged parallel to one another and in a common plane in stacked form beside the electrochemically active regions and are integrated components of the system.

8. The system in accordance with claim 1, wherein a fuel/air mixture is capable of being supplied to the reformer.

9. The system in accordance with claim 1, wherein heat exchangers are arranged at the afterburners.

10. The system in accordance with claim 1, wherein heat exchangers are arranged at the reformers.

11. The system in accordance with claim 1, wherein gas spaces arranged next to one another are separated from one another in a fluid-tight manner using solid electrolyte of the cathode-electrolyte-anode units.

* * * * *